(12) United States Patent
Wilson (10) Patent No.: US 8,310,776 B2
(45) Date of Patent: Nov. 13, 2012

(54) HIGH SPEED WRITER

(75) Inventor: Ross S. Wilson, Menlo Park, CA (US)

(73) Assignee: LSI Corporation, Milpitas, CA (US)

( * ) Notice: Subject to any disclaimer, the term of this patent is extended or adjusted under 35 U.S.C. 154(b) by 94 days.

(21) Appl. No.: 12/880,463

(22) Filed: Sep. 13, 2010

(65) Prior Publication Data

US 2012/0063025 A1 Mar. 15, 2012

(51) Int. Cl.
*G11B 5/09* (2006.01)
*G11B 5/02* (2006.01)
*G11B 5/48* (2006.01)
*G11B 21/16* (2006.01)

(52) U.S. Cl. ............... 360/46; 360/68; 360/246.2
(58) Field of Classification Search ............ None
See application file for complete search history.

(56) References Cited

U.S. PATENT DOCUMENTS

| 5,822,141 | A * | 10/1998 | Chung et al. ............ 360/46 |
| 6,525,892 | B1 * | 2/2003 | Dunbar et al. ............ 360/31 |
| 7,006,314 | B2 | 2/2006 | Takahashi ............ 360/46 |
| 7,881,003 | B1 * | 2/2011 | Aram et al. ............ 360/68 |
| 2002/0057512 | A1 * | 5/2002 | Chung et al. ............ 360/67 |
| 2010/0277835 | A1 * | 11/2010 | Honjo et al. ............ 360/266.3 |
| 2011/0116193 | A1 * | 5/2011 | Gubbins et al. ............ 360/246.2 |

* cited by examiner

*Primary Examiner* — Regina N Holder
(74) *Attorney, Agent, or Firm* — Christopher P. Maiorana, PC (57) ABSTRACT

An apparatus comprising a control circuit, a driver circuit and a write head. The control circuit may be configured to generate a plurality of control signals in response to a data input signal. The driver circuit may be configured to generate a differential write control signal in response to the plurality of control signals. The driver circuit may receive the plurality of control signals through a flexible bus. The driver circuit may be located remotely from the control circuit. The write head may be configured to write information by physically moving above one of a plurality of tracks on a disk in response to the write control signal. The driver circuit may be configured to move along with the write head.

15 Claims, 6 Drawing Sheets

HIGH SPEED WRITER

FIELD OF THE INVENTION

The present invention relates to data storage generally and, more particularly, to a method and/or apparatus for implementing a high speed writer employing a centertapped write head that may be used in a data storage system.

BACKGROUND OF THE INVENTION

Conventional writers generally use bridge circuits to route current bidirectionally in a two-terminal recording head. As recording speeds have risen to greater than 2 Gb/s, writer drivers have used complementary PNP devices in order to obtain symmetrical bi-directional fast-rise current flow in the write head. Conventional writers are separated from the write element by a transmission line approximately 2 cm in length. Therefore, the transmission line terminates at the sending end in order to reduce data-dependent jitter caused by reflections. Sufficient precharge pulse (or overshoot) is needed to secure a fast rise time for the writer head current. Overshoot is applied to increase transition gradient in the writing process. Such increase is not always necessary in Heat Assisted Magnetic Recording (HAMR) systems which rely on heat modulation to imprint transitions into the medium. In such HAMR systems, which rely on laser radiation to heat the medium, the magnetic field needs to reach steady-state before laser illumination is switched.

Some conventional writers use a SiGe process to secure additional writer performance. Complementary SiGe BiCMOS processes are costly, especially if the PNP device implements a germanium-doped base. Because hole mobility is lower than that of electrons, PNP transistors are inherently slower than NPN devices.

High current transmission lines connecting the writer to the write head use a termination at the writer to prevent interference caused by back-reflection from the head (unless a broadband termination can be designed in the head). This results in losses and a degraded risetime. Broadband termination in the writer is also impaired by shunt capacitances.

It would be desirable to implement a writer that does not use PNP transistors while also providing high data rates and/or lower power consumption.

SUMMARY OF THE INVENTION

The present invention concerns an apparatus comprising a control circuit, a driver circuit and a write head. The control circuit may be configured to generate a plurality of control signals in response to a data input signal. The driver circuit may be configured to generate a differential write control signal in response to the plurality of control signals. The driver circuit may receive the plurality of control signals through a flexible bus. The driver circuit may be located remotely from the control circuit. The write head may be configured to write information by physically moving above one of a plurality of tracks on a disk in response to the write control signal. The driver circuit may be configured to move along with the write head.

The objects, features and advantages of the present invention include providing a writer that may (i) be implemented using only NPN transistors (without PNP transistors), (ii) be implemented using center-tapped write heads, (iii) be located on the write head/slider, (iv) be implemented without an intervening transmission line between a write driver and a write head, (v) achieve high data rates, (vi) reduce power and/or (vii) be implemented at low cost.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
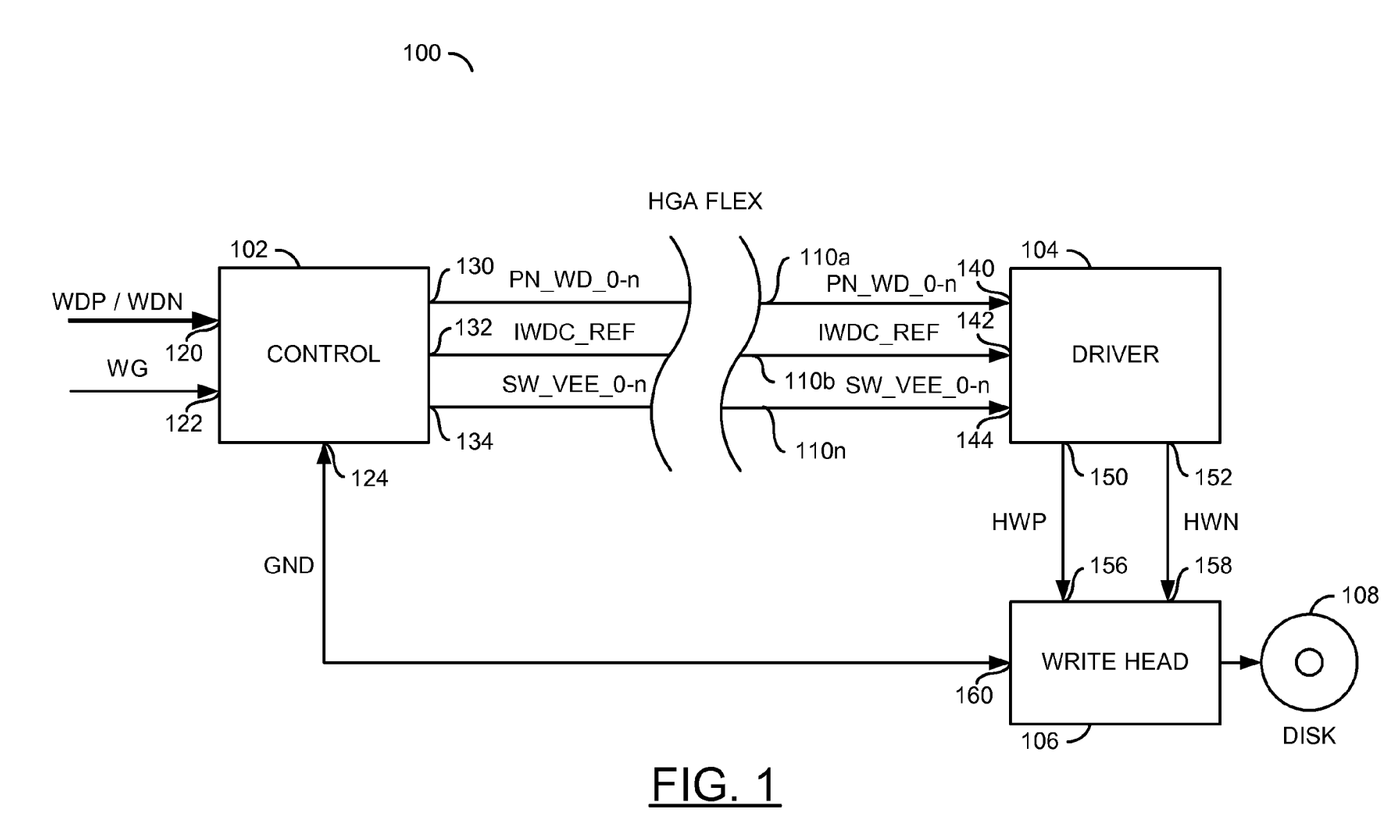
FIG. 1 is a block diagram of an embodiment of the present invention.

Referring to FIG. 1, a block diagram of a circuit 100 is shown in accordance with the present invention. The circuit 100 may be implemented as high speed writer. In one example, the circuit 100 may employ a centertapped write head. In one example, the circuit 100 may be implemented in a magnetic recording system. However, the circuit 100 may be implemented in other types of systems, such as a magneto-optical recording system. The circuit 100 generally comprises a block (or circuit) 102, a block (or circuit) 104, a block (or circuit) 106 and a disc 108. The circuit 102 may be implemented as a control circuit. The circuit 104 may be implemented as a driver circuit. In one example, the driver circuit 104 may be implemented on a slider. Implementing the driver circuit 104 on a slider may allow the driver circuit 104 to be located remotely from the control circuit 102. The circuit 106 may be implemented as a write head circuit. The circuit 102 and the circuit 104 may be connected by one or more transmission lines 110a-110n. In one example, the transmission lines 110a-110n may be implemented as head gimbal assembly (HGA) flex transmission lines, flex-on-suspension (FOS) transmission lines, or other appropriate flexible transmission lines. The transmission lines 110a-110n may be configured to allow, in one example, the driver circuit 104 to move along with the write head circuit 106.

The circuit 102 may have an input 120 that may receive a signal (e.g., WDP/WDN), and an input 122 that may receive a signal (e.g., WG) and an input/output 124 that may receive/present a signal (e.g., GND). The signal WDP/WDN may be implemented as a high speed write data signal. In one example, the signal WDP/WDN may be provided in a balanced differential format (e.g., PECL—positive emitter-coupled logic, which may swing between 3.3 v and 4.1 v, or other appropriate differential format). The signal WG may be implemented as a write gate signal. The signal. WDP/WDN and the signal WG may be signals received from an external source (not shown). The signal GND may be implemented as a ground signal. The circuit 102 may have an output 130 that may present a number of signals (e.g., PN_WD_0-n) to the transmission line 110a, an output 132 that may present a signal (e.g., IWDC_REF) to the transmission line 110b, and an output 134 that may present a number of signals (e.g., SW_VEE_0-n) to the transmission line 110n. The signals SW_VEE_0-n may be implemented as switched VEE signals. The signals PN_WD_0-n and SW_VEE_0-n may provide signals specific to each of a number of write heads within the write head circuit 106 (to be described in more detail in connection with FIG. 2). The signal IWDC_REF may be a signal common to each of the write heads. The signal IWDC_REF may be implemented as a write current reference.

The signals PN_WD_0-n may be differential signals representing data.

The driver circuit 104 may have an input 140 that may receive the signals PN_WD_0-n, an input 142 that may receive the signal IWDC_REF and an input 144 that may receive the signals SW_VEE_0-n. The driver circuit 104 may have an output 150 that may present a signal (e.g., HWP), and an output 152 that may present a signal (e.g., HWN). The driver circuit may be implemented as a number of sub-driver circuits (to be described in more detail in connection with FIG. 2). In one example, the particular number of driver circuits may be a 1-to-1 ratio to the particular number of write heads implemented in a particular drive system. However, other ratios, such as 1 driver for a number of write heads may be implemented to meet the design criteria of a particular implementation. In general, each write head receives a differential signal HWP and HWN. The write head block may have an input 156 that may receive the signals HWPa-n, an input 158 that may receive the signal HWNa-n, and an input 160 that may receive the signal GND.

In one example, the writer circuit 100 may be implemented as an all-NPN transistor design. Therefore, data rates may be extended beyond what is currently available. The costs associated with an all-NPN design may be lower than a design implemented with a complementary NPN/PNP process. The circuit 100 may also reduce power consumption compared with conventional approaches. For example, the writer circuit 100 may be capable of operating in the 10 Gb/s range. In one example, SiGe NPN devices may be implemented.

However, other NPN devices may be implemented to meet the design criteria of a particular implementation. Since the writer circuit 100 may be implemented without the use of high-speed PNP transistors, process costs may be reduced allowing use in a variety of high-performance applications. In one example, the high-performance application may be a standard SiGe or non-SiGe process. However, other high-performance applications may be implemented to meet the design criteria of a particular implementation.

Figure 2:
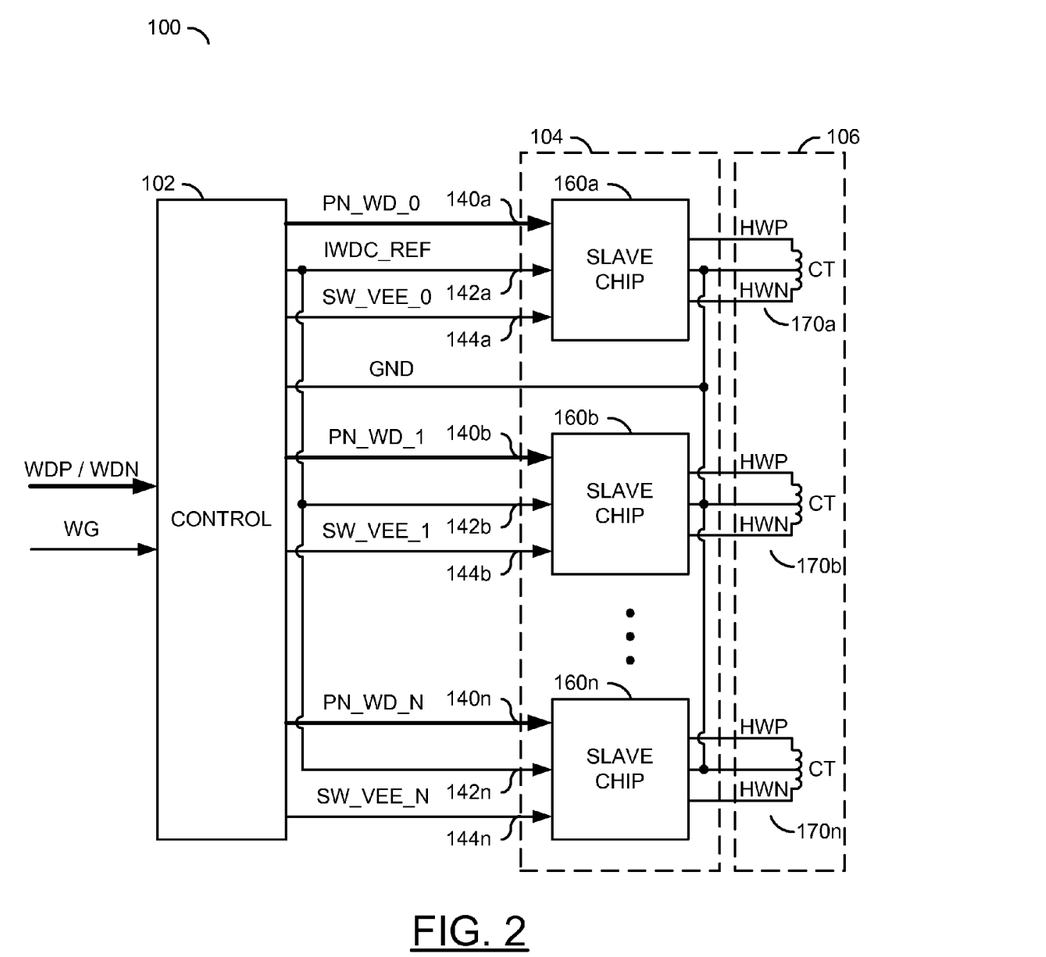
FIG. 2 is a more detailed diagram of the embodiment of FIG. 1.

In one example, the writer circuit 100 may employ an overdriven differential amplifier. The writer circuit 100 may also employ a center-tapped recording head. Implementing a center-tapped recording head may eliminate the need for a traditional complex bidirectional writer bridge. For example, the write head circuit 106 may tap a center of a write coil to receive the signal GND. Since a bidirectional writer bridge is not needed, the writer circuit 100 may be implemented without PNP transistors. Referring to FIG. 2, a more detailed diagram of the circuit 100 is shown. The driver circuit 104 generally comprises a number of sub-driver circuits 160a-160n. The write head circuit 106 generally comprises a number of sub-write head circuits 170a-170n. Each of the driver circuits 160a-160n may receive the signal IWDC_REF, one of the signals SW_VEE_0-n, and one of the signals PN_WD_0-n. The signals PN-WD_0-n may be preferably transmitted in differential format (where P denotes one signal and N denotes a complementary differential signal) due to expected high data speeds.

The sub-driver circuits 160a-160n may be located near the sub-write heads 170a-170n. In one example, the sub-drivers 160a-160n may be bonded directly to a head slider. A head slider (or slider) may be implemented to physically support the sub-write heads 170a-170n in a targeted position over a particular one of a plurality tracks of the disc 108. The sub-driver circuits 160a-160n may each comprise a small slave chip configured to drive a respective one of the sub-write head circuits 170a-170n. The location of the sub-driver circuits 160a-160n may be proximate to the sub-write heads 170a-170n. The sub-driver circuits 160a-160n may be controlled by the circuit 102, which may be implemented as a common master chip. The master chip 102 may comprise a number of writer controls. The master chip 102 may also comprise a number of readers (not shown). The readers may be implemented to amplify the signals from the read heads (not shown). The read heads may be fabricated on a common slider with the sub-write head circuits 160a-160n. One reader is typically implemented for each sub-write head 170a-170n.

The sub-driver chips 160a-160n may be bonded to the slider. The sub-driver circuits 160a-160n may be implemented as a number of slave chips. In one example, the sub-driver circuits 160a-160n may be fabricated as one or more individual dies which are then bonded to the sliders carrying the read and write heads 170a-170n. In an alternative example, if a process is available to fabricate the read/write heads 170a-170n on a silicon substrate, it may be possible to fabricate the sub-drivers 160a-160n and the write heads 170a-170n on a common substratum.

In one example, the sub-driver circuits 160a-160n may be located along with the sub-write heads 170a-170n. If assembly process and/or power-dissipation considerations preclude such mounting, the sub-driver circuits 160a-160n may be incorporated in a preamplifier implemented on a common silicon wafer with the control circuit 102. Such a preamplifier may also contain circuits to process the output of the read heads associated with the sub-write heads 170a-170n. Such a preamplifier may be located remotely from the sub-write heads 170a-170n and joined by a second flexible transmission line (not shown). The second flexible transmission line may also be implemented as a flex-on-suspension (FOS) transmission lines, or other appropriate flexible transmission liens. An all-NPN overshoot driver may be implemented to obtain adequate risetime. The benefits of all-NPN construction are not sacrificed.

The circuit 100 may be implemented without high-current writer-to-head transmission lines. However, the transmission lines 110a-110n may be implemented to convey write data from the master chip 102 to the slave chips 160a-160n. The transmission lines 110a-110n may carry low-level signals, and may be terminated at both sending and receiving ends in order to secure best signal fidelity. The driver circuit 104 may or may not be implemented on the slider. For example, the driver circuit 104 may be implemented as part of the circuit 102. In this case, a single chip solution may be implemented. If the circuit 102 and the circuit 104 are merged, then the transmission lines 110a-110n may be external transmission lines representing on-chip interconnects. A gain stage may be implemented between the sub-driver circuits 160a-160n and the sub-write head 170a-170n. In such an implementation, write current risetime degradation due to presence of the line may be reduced. Also, conventional overshoot circuitry may not be needed.

The example shown in FIG. 2 illustrates a writer system 100 with four writer heads is shown. However, the particular number of write heads may be varied to meet the design criteria of a particular implementation. The slider-mounted slave chips 160a-160n may employ an overdriven current switching NPN differential pair to route current through either the signal HWP or the signal HWN to a head terminal. In general, no PNP devices need to be implemented. The presence of gain in the differential pair may compensate for risetime degradation in the transmission lines 110a-nused to convey write data from the master chip 102 to the slave chips 140a-n. The output capacitance may be approximately half that of current-mode complementary writers, since no PNP devices are attached to the output terminals.

The slave chips 160a-160n may operate between the voltage levels of the signal SWVEE and the signal GND. A particular one of the slave circuits 160a-160n may be enabled by switching the signal SW_VEE from GND to VEE (e.g., −4V, but other voltages may be implemented). The signal WG may be configured to control switching the signal SW_VEE to activate one of the slave chips 160a-160n during a write cycle.

Figure 3:
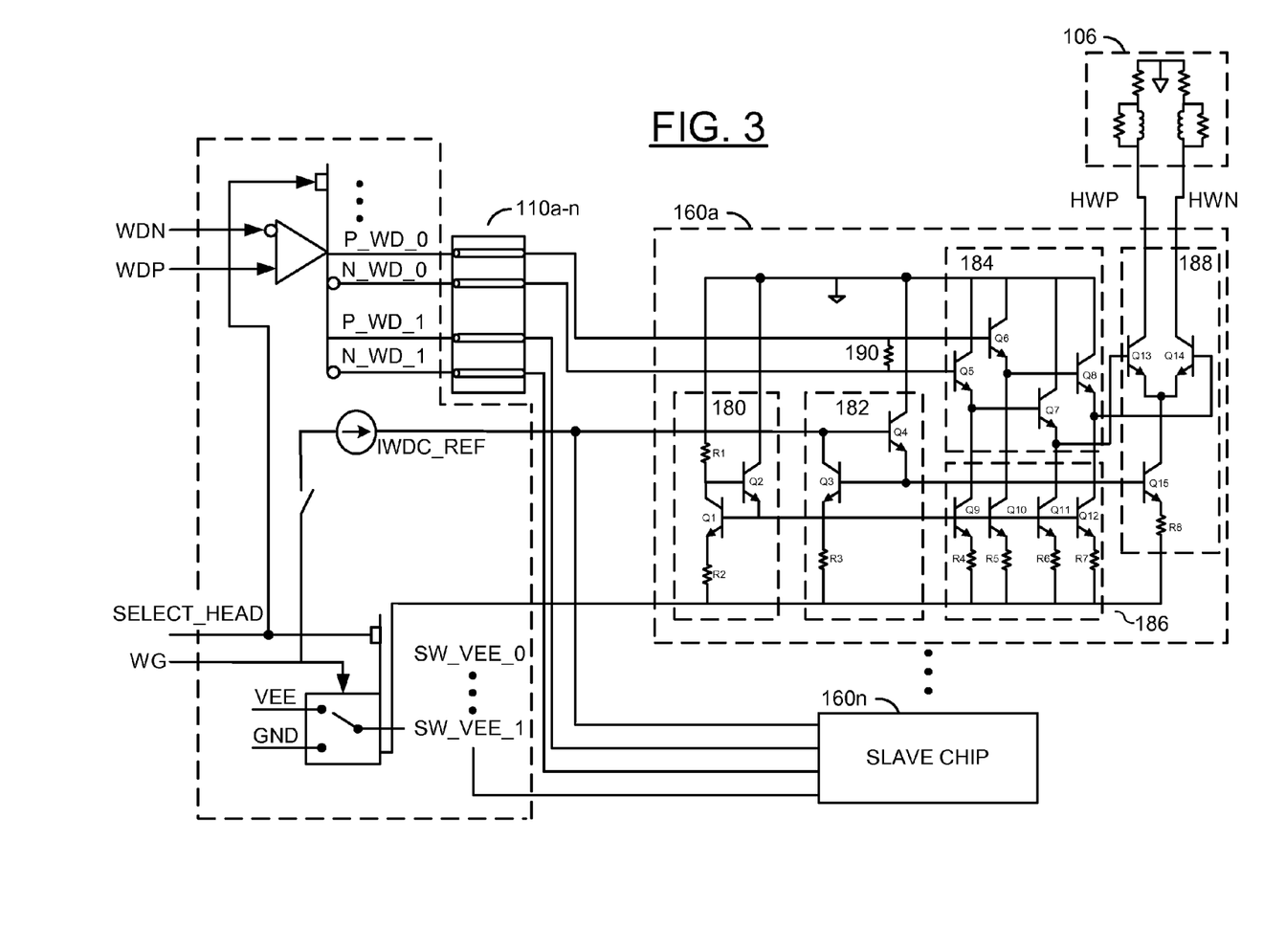
FIG. 3 is a circuit diagram of an embodiment of the present invention.

Referring to FIG. 3, a more detailed diagram of a writer system 100 is shown. The master chip 102 is shown with a detailed schematic diagram of the slave chip 160a and a block diagram of the slave chip 160n. The slave chip 160a may receive low-level write data in differential pairs (e.g., P_WD_0/N_WD_0; P_WD_1/N_WD_1, etc.) from the master chip 102 in a star fashion. The slave chip 160a generally comprises a circuit 180, a circuit 182, a circuit 184, a circuit 186 and a circuit 188. The circuit 180 may be implemented as a current mirror master. The circuit 182 may also be implemented as a current mirror master. The circuit 184 may be implemented as a set of cascaded emitter follower buffers. The circuit 186 may be implemented as an array of current mirrors. The circuit 184 may have tail currents received from the circuit 186.

The circuit 188 may be implemented as a differential current switch pair. The circuit 188 may be switched by a write current through one side of the write head 106. Current may be provided by a mirror from the circuit 182. The emitter follower circuit 184 may buffer and level-shift the signal PN_WD_0 to drive the bases of the writer output differential pair circuit 186. The follower tail current from the circuit 186 may be locally derived on the slave chip 160a. The follower tail current may be a constant current.

The circuit 180 generally comprises a transistor Q1, a transistor Q2, a resistor R1 and a resistor R2. The circuit 182 generally comprises a transistor Q3, a transistor Q4 and a resistor R3. The circuit 184 generally comprises a transistor Q5, a transistor Q6, a transistor Q7 and a transistor Q8. The circuit 186 generally comprises a transistor Q9, a transistor Q10, a transistor Q11, a transistor Q12, a resistor R4, a resistor R5, a resistor R6 and a resistor R7. The circuit 188 generally comprises a transistor Q13, a transistor Q14, a transistor Q15 and a resistor R8. A resistor 190 is shown terminating the transmission lines 110a-110b. The resistor 190 may be implemented to avoid back reflections. The circuit 106 is shown implementing a write head that receives the signal HWP and the signal HWN. A center-tapped ground terminal is shown.

In one example, the write current may be mirrored into the tail of the writer overdriven differential pair circuit 188. In another example, the writer current may be presented to the slave circuit 160a as an emitter current. Such an approach may implement a larger VEE headroom in the master chip, as discussed in FIG. 2.

Figure 4A:
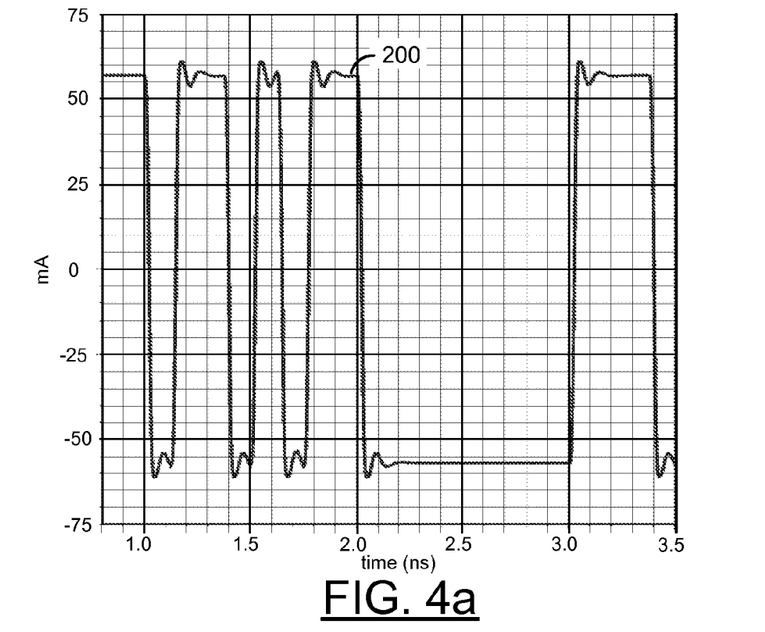
FIGS. 4a through 4d are graphs of various signals of the present invention.

Referring to FIG. 4a-d, various graphs are shown. FIG. 4a is a graph of a waveform 200 is shown. The waveform 200 illustrates a writer head risetime of approximately 19.5 ps. The waveform 200 shows a random data time domain plot. The waveform 200 illustrates a difference between the signal HWP and the signal HWN. The x-axis is shown in nS. The y-axis is shown in mA.

Figure 4B:
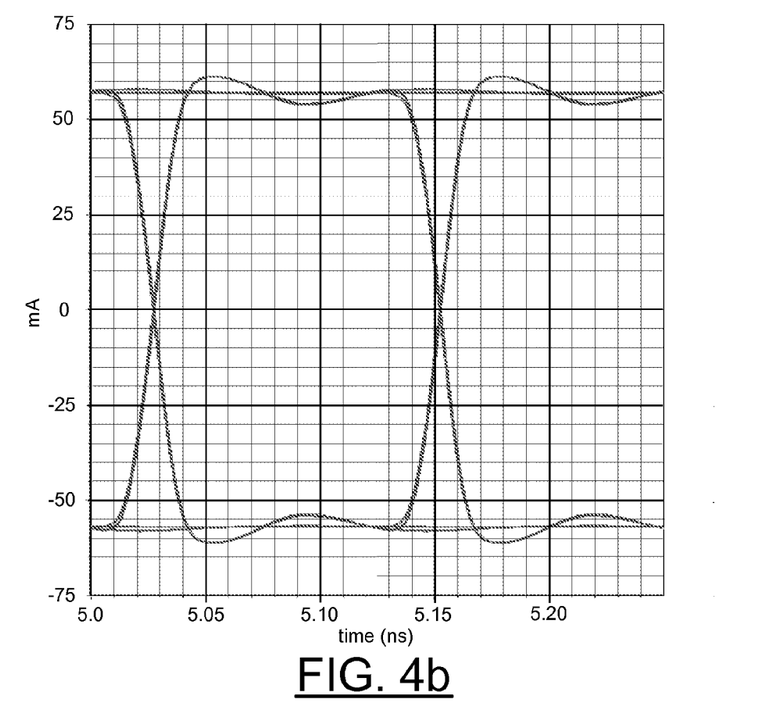

Referring to FIG. 4b, a graph of an eye pattern is shown. FIG. 4b shows an eye pattern for data written at an exemplary data rate of 8 Gb/s using an exemplary 60 mA write head current. FIG. 4b illustrates an eye pattern with very little intersymbol interference (ISI). FIG. 4b has an x-axis shown in nS, and a y-axis shown in mA.

Figure 4C:
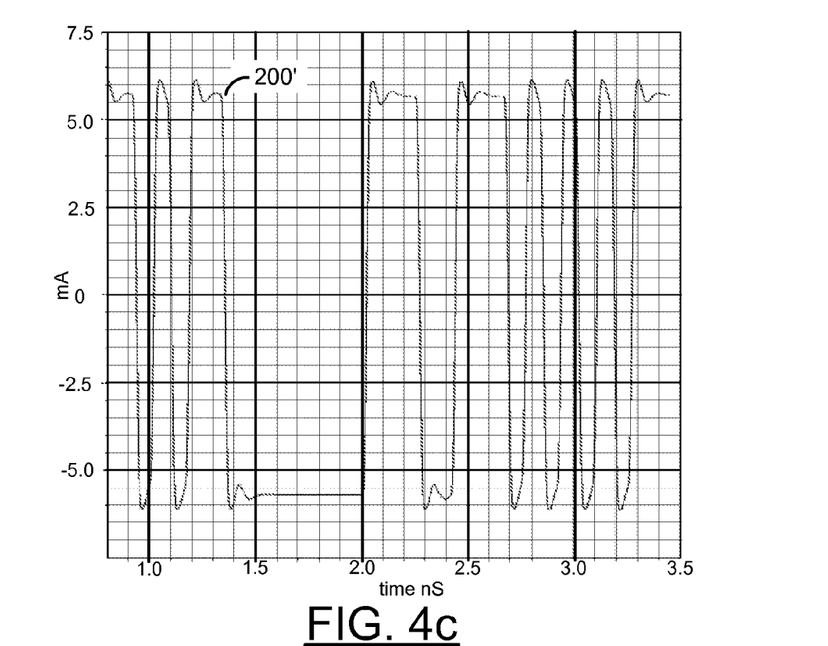

Referring to FIG. 4c, a graph of a waveform 200″ is shown. The waveform 200″ shows a random data time domain plot. The x-axis is shown in nS. The y-axis is shown in mA. The x-axis is shown in nS. The y-axis is shown in mA.

Figure 4D:
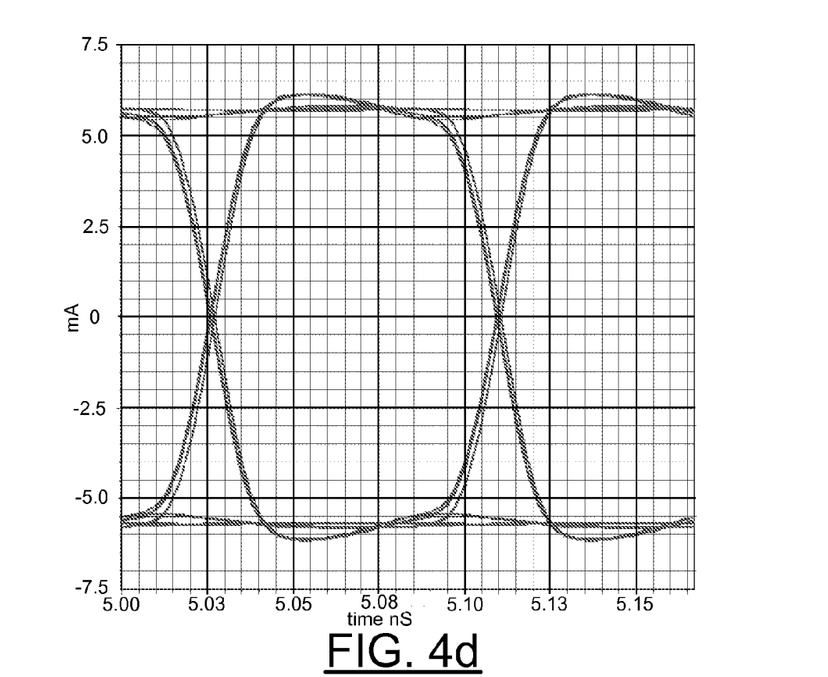

Referring to FIG. 4d, a graph of an eye pattern is shown. FIG. 4d shows an eye pattern for data written at an exemplary rate of 12 Gb/s. The y-axis is shown in mA. The x-axis is shown in nS. The y-axis is shown in mA. An exemplary write head current of 60 mA is shown.

Eye patterns with a typical head having an inductance of 500 pH and 3.6 Ohms per side (HWP-CT or HWN-CT) display approximately 19.5 ps rise/fall times are shown. This is consistent with approximately 12 Gb/s magnetic recording where a risetime Tr is approximately 25% Tbit. Zero-cross jitter may be negligible. Lowering a head inductance and/or increasing differential pair overdrive may further reduce the risetime Tr.

Overshoot circuitry may be added as a second overdriven differential pair comprising three devices. The three devices may be configured so that when overshoot current is not flowing into either head terminal, the overshoot is diverted to GND through a third transistor. However, overshoot may not be necessary due to faster risetimes and/or the ability to set IWdc higher than necessary for magnetic saturation of the record medium.

Although presented as a slider-mounted chip, the center-tapped-head, all-NPN-driver implementation may also be used in standard context with a write driver located in a main preamplifier located remotely from the head. In this case, an all-NPN overshoot circuit may be necessary to precharge the transmission line interconnect and attain adequate write current risetimes.

Transmission line construction may provide a common return to which the signal HWP and the signal HWN are coupled. The signal HWP and the signal HWN may also be decoupled. If the signal HWP and the signal HWN are decoupled, a structure may be implemented where the return is placed between the signal HWP and the signal HWN lines in either a multilayer or planar fashion.

Figure 5:
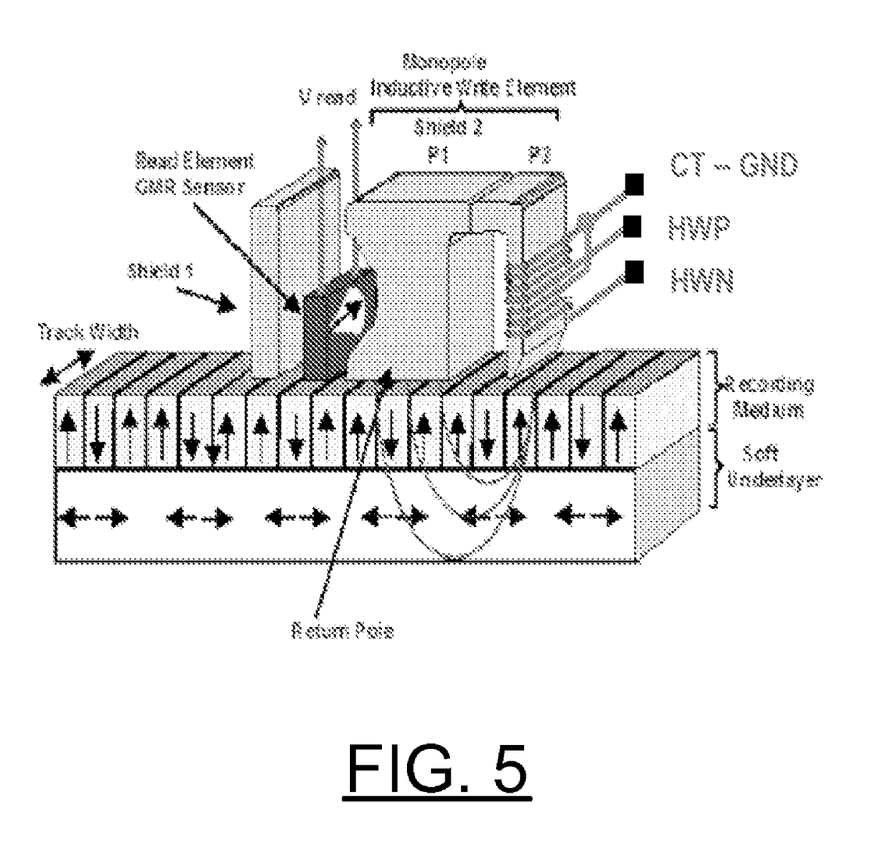
FIG. 5 is an example of a center tapped write head.

Referring to FIG. 5, a center-tapped perpendicular magnetic recording (PMR) write head is shown in accordance with a preferred embodiment of the present invention. The center tap may be tied to a common potential (e.g., GND). Current may be drawn from the signal HWP when the signal HWN is unenergized. This may cause a north magnetization of the medium. Current may also be drawn from the signal HWN when the signal HWP is unenergized. This may cause south magnetization of the medium. Volume allotted for the write coil may be doubled compared with a head having the same number of Ampere-turns as a conventional head. Each side of the center tap may have approximately the same number of turns as the existing head. For example, eight turns may be implemented. However, the particular number of turns may be varied to meet the design criteria of a particular implementation. Write currents may be implemented as a base-to-peak of less than 80 mA if coupling efficiency preserved. If the turns count is reduced and/or efficiency diminishes, write current may be increased. Current flow is generally out of one or other active head terminal.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a control circuit configured to generate a plurality of control signals in response to a data input signal, wherein said plurality of control signals have a level less than needed to write data;
   a driver circuit configured to generate a differential write control signal in response to (i) said plurality of control signals and (ii) a current source, wherein (A) said plurality of write control signals have a level sufficient to write data and (B) said driver circuit (i) receives said plurality of control signals through a flexible bus, (ii) receives said current source through said flexible bus and (iii) is located remotely from the control circuit; and
   a write head configured to write information by physically moving above one of plurality of tracks on a disk in response to said write control signal, wherein said driver circuit moves along with said write head.

2. The apparatus according to claim 1, wherein said differential write control signal comprises a center tap connected to a ground signal.

3. The apparatus according to claim 1, wherein said driver circuit is implemented with a plurality of NPN devices.

4. The apparatus according to claim 1, wherein said apparatus comprises a plurality of write heads and a plurality of corresponding driver circuits.

5. The apparatus according to claim 4, wherein each of said driver circuits receives (i) one or more control signals specific to said drive circuit and (ii) one or more control signals common to all of said driver circuits.

6. The apparatus according to claim 4, wherein each of said write heads is configured to write to one of said plurality of tracks.

7. The apparatus according to claim 1, wherein an actuator driver circuit is stationary and located on a printed circuit board.

8. The apparatus according to claim 7, wherein said driver circuit is separate from said printed circuit board.

9. The apparatus according to claim 1, wherein said data input signal activates a write process.

10. The apparatus according to claim 1, wherein said data input signal is an amplified writeback signal in differential form.

11. The apparatus according to claim 1, wherein said plurality of control signals comprise (i) a low level write data signal, (ii) a reference signal and (iii) a maximum operation voltage level for said driver circuit.

12. The apparatus according to claim 1, wherein said driver circuit and said write head are mounted on a slider.

13. The apparatus according to claim 1, wherein an actuator driver circuit comprises a preamplifier separate from said driver circuit.

14. An apparatus comprising:
   means for generating a plurality of control signals in response to a data input signal, wherein said plurality of control signals have a level less than needed to write data;
   means for generating a differential write control signal in response to (i) said plurality of control signals and (ii) a current source, wherein (A) said plurality of write control signals have a level sufficient to write data and (B) said means for generating said differential write control circuit (i) receives said plurality of control signals through a flexible bus, (ii) receives said current source through said flexible bus and (iii) is located remotely from the control circuit; and
   means for writing information by physically moving above one of plurality of tracks on a disk in response to said write control signal, wherein said means for generating said differential write control circuit moves along with said write head.

15. A method for writing to a disk comprising the steps of:
   (A) generating a plurality of control signals with a control circuit in response to a data input signal, wherein said plurality of control signals have a level less than needed to write data;
   (B) generating a differential write control signal with a driver circuit in response to said plurality of control signals and a current source, wherein said differential write control signals have a level sufficient to write data;
   (C) receiving said plurality of control signals and said current source through a flexible bus;
   (D) remotely locating said drive circuit from the control circuit; and
   (E) a write head for writing information by physically moving above one of plurality of tracks on a disk in response to said write control signal, wherein said driver circuit moves along with said write head.

* * * * *